(12) United States Patent
Sasselli et al.

(10) Patent No.: US 7,440,571 B2
(45) Date of Patent: Oct. 21, 2008

(54) METHOD FOR SECURING SOFTWARE UPDATES

(75) Inventors: Marco Sasselli, Chardonne (CH);
Nicolas Pican, Lausanne (FR)

(73) Assignee: Nagravision S.A., Cheseaux-sur-Lausanne (CH)

( * ) Notice: Subject to any disclaimer, the term of this patent is extended or adjusted under 35 U.S.C. 154(b) by 677 days.

(21) Appl. No.: 10/721,228

(22) Filed: Nov. 26, 2003

(65) Prior Publication Data
US 2004/0107349 A1    Jun. 3, 2004

(30) Foreign Application Priority Data
Dec. 3, 2002    (CH)    .................................... 2043/02

(51) Int. Cl.
*H04L 9/00* (2006.01)
(52) U.S. Cl. ......................... 380/264; 380/282; 380/285
(58) Field of Classification Search .................. 713/181; 707/5; 380/264, 282, 285
See application file for complete search history.

(56) References Cited

U.S. PATENT DOCUMENTS 6,952,823 B2 * 10/2005 Kryloff et al. ............... 717/170
7,120,251 B1 * 10/2006 Kawada et al. .............. 380/201
7,174,017 B2 * 2/2007 Bantz et al. .................. 380/255
2002/0029347 A1   3/2002 Edelman
2003/0196096 A1 * 10/2003 Sutton ......................... 713/181

FOREIGN PATENT DOCUMENTS

WO    WO 98/43431    10/1998
WO    WO 01/35670    5/2001

* cited by examiner

*Primary Examiner*—Nasser Moazzami
*Assistant Examiner*—Mohammad W Reza
(74) *Attorney, Agent, or Firm*—DLA Piper LLP (US)

(57) ABSTRACT

This invention proposes a method for securing updating software in a plurality of decoders based on the generation of a signature by means of a private asymmetrical key. The updating of a decoder is carried out by downloading, from a managing center, a data block including a patch and its signature, said block is stored in a RAM. The signature is decrypted with a current public key from a list contained in a first non-volatile memory of the decoder, then verified and in the case of correspondence, a command leads the installation of the patch in a second non-volatile Flash memory and the deactivation of the current key. The aim of this invention is to considerably reduce the impact of the discovery of a private key by mean of a systematic analysis of the working of the decoder software, or to notably increase the time and the means necessary for the process used to determine said private key.

18 Claims, 2 Drawing Sheets

METHOD FOR SECURING SOFTWARE UPDATES

BACKGROUND OF THE INVENTION

This invention concerns a method for securing processing software updates ensuring the working of various systems. In particular, the method of this invention uses a numerical signature mechanism with a private key of an asymmetrical encryption algorithm.

A system is defined here as an apparatus or a set of apparatuses which functioning depends on one or several software programs stored in a non-volatile memory or on a hard disk. When the functionality of the system must be improved or completed in order to adapt to the increasing demands of the user, it is often necessary to only update the related software without therefore having to change all the material making up the system.

In general, updating a given software is carried out by replacing software files already installed or by adding new files for completing those which are already stored. The assembly thus constitutes a new version of the software previously installed in the system that benefits in this way from the desired improvements.

Various apparatuses such as computers and their peripheral equipment, vending machines, fixed and mobile phones, Pay-TV decoders, etc. are controlled by software programs adapted to their configuration and to the functions of specific components.

For example, in a Pay-TV decoder (Set Top Box), processing software controls peripheral equipment such as a hard disk, a chip card reader, data reception interfaces and memories. In order to introduce changes either at the configuration level or at functionality level, it is sometimes necessary to replace the existing software or to introduce improvements to that which is already installed in the decoder. This type of improvement takes place by means of software portions, called updates or patches, provided by the operator's managing center, to which a certain number of users are subscribed. These updates are regularly provided by the managing center and are downloaded into the decoders of each subscriber possessing the necessary rights.

The document WO98/43431 describes a method for downloading applications into a receiver/decoder. The application software is divided into modules and the downloading of the modules is preceded by a search of a directory module at a determined local address. The modules are signed and the directory module is signed and encrypted in such a way that a single encryption is applied to all the modules forming the application. Several public encryption keys are stored in a read only memory (ROM) of the receiver/decoder. The applications can thus be created by means of different sources without the knowledge of each of their private keys being required. A directory signature can be concealed in a variable position in an arbitrary data block of the directory module. An application to be downloaded can be verified by making a comparison with an application validation bitmap stored in the receiver/decoder.

The document WO01/35670 describes an information authentication method transmitted to a Pay-TV decoder. A software object and a separated data structure containing the authorization data are numerically signed with a global signature that covers both objects. These objects are transmitted separately to the decoder. Once the decoder has received these objects, the signature is verified. In general, decoder users have a subscription contract with an operator that guarantees a regular maintenance service for the software installed in the decoder. In order to limit misuse such as unauthorized copies and the introduction of foreign software components, it is essential to secure the software updating of the decoder. A known method consists in using a digest coded with an asymmetrical encryption algorithm key of the RSA type. The updating software is provided on-line with a digest obtained by means of a unidirectional hash function. This digest is made up of a single image representing the whole updating and it is assumed that two identical digests never exist on two identical assemblies with different data. This digest is encrypted thanks to an operator's private key associated to a group of subscribers, which constitutes a signature specific to this group. The software accompanied by this signature is loaded in a RAM (Random Access Memory) of the decoder. A program belonging to the decoder software calculates a digest of the software stored in the RAM with the hash function. The received signature is decrypted with a public key contained in the decoder and is then compared to the software digest calculated previously. If the decrypted signature corresponds to the digest obtained by means of the hash function, the signature accompanying the update stored in the RAM will be considered as valid. The updating software will be installed in the non-volatile memory of the decoder (Flash memory).

The securing process is thus carried out by means of the verification of the signature with a public key in the decoder which corresponds to the operator's private key.

The public key present in the decoder as well as the program allowing signature verification must be fixed. The authenticity of the signature is guaranteed owing to the fact that the private key depends on the decoder's public key. The signature cannot be reproduced because the private key is only known by a given operator. Furthermore, the same signature is useless for various different updates since it is a function of a well-defined updating. A signed updating software whose content is modified in the RAM will produce another digest which cannot thus be validated by the signature decrypted by the public key. In fact, the digest obtained after the hashing of the updating software at the level of the decoder is different to that obtained after decrypting the signature.

However, this securing method includes a weak point consisting in the operator's private key itself. In fact, when said key is discovered by a third party, it can sign any software and lead to abusive modifications of the system.

This discovery can be made by means of iteration on the public key that the third party has extracted from the decoder until the correct pair of keys are discovered. The countermeasure, that consists in modifying the behavior of the decoder software so that it refuses the signatures generated with the discovered key, is insufficient since these modifications can be avoided by the third party by using suitable programs.

The aim of this invention is to considerably reduce the impact of the discovery of a private key by mean of a systematic analysis of the working of the decoder software, or to notably increase the time and the means necessary for the process used to determine said private key.

The aim is achieved by means of a securing method for data updating in a plurality of apparatuses, each apparatus receiving the updates from a managing center, these updates including data called patch accompanied by a control block encrypted by a private asymmetrical key taken from a list of keys contained in the managing center, characterized by the following steps:

selection by the apparatus of a current key from a list of public keys, reception of the updating patch and storage in the memory,
reception of the encrypted control block,
decryption of said block by the current public key,
verification that the decrypted control block corresponds to said patch,
installation of the patch received,
deactivation of the current key and selection of the next key on the list.

The data of an update is transmitted by the managing center in the form of a patch and a control block including a signature made up by the digest of the patch encrypted with a private key from the managing center. The decoder stores this data in the RAM memory for processing. A public key, associated to this private key, called the current key, is selected from a list stored in a first non-volatile memory in order to decrypt the patch signature. In the case that decryption and verification are successful, a command is carried out leading to the installation of the patch in a second non-volatile memory (Flash) of the decoder. The current key used in this way is deactivated on the list, which makes the following key available for the next update.

When the verification of the signature and the decryption of a decoder update is carried out with a public key from the list, said key is deleted and cannot be used for further updates. Thus, a new key is used for each update and is then eliminated from the list. The public key from the list as well as the program serving to verify the signatures must be non-modifiable. Only the list can be modified (elimination of used keys) with the verification program.

The above-described method allows a considerable reduction of the possibilities of decoder modifications by a third party having discovered a private key. Since a key can only be used once, the third party will only carry out a single modification. Consequently, a modification of decoder behavior in order to protect it from piracy is more effective since the third party, no longer in possession of a valid private key, is unable to access the apparatus.

Due to the fact that the number of private keys is larger, a third party must therefore systematically activate all the keys to avoid to be blocked at the update corresponding to the discovered key. It is necessary to know that the development of the decoders' software is fast and considering that if one of the keys is discovered the following updates will fill the security gap that the third party would have been able to introduce. If this third party is able to block all subsequent updates, the functionalities of the decoder will rapidly become obsolete and therefore without any important prejudice to the operator.

The use of asymmetric keys is important in this context since the extraction of public keys from a decoder does not allow the implementation of an acceptable update because said update must be signed by the operator's private key. It is common to place the private keys in the secured part (the operator) and the public keys in the public domain part (the decoder). Nevertheless, it is possible to invert the keys without damaging the functioning of the present invention.

A first embodiment of the invention proposes the use of public keys taken from the list according to a pre-determined order. Therefore, each key is taken from the list as soon as the previous key has been used.

The invention will be better understood thanks to the following detailed description with reference to the attached figures serving as a non-limitative example, namely:

Figure 1:
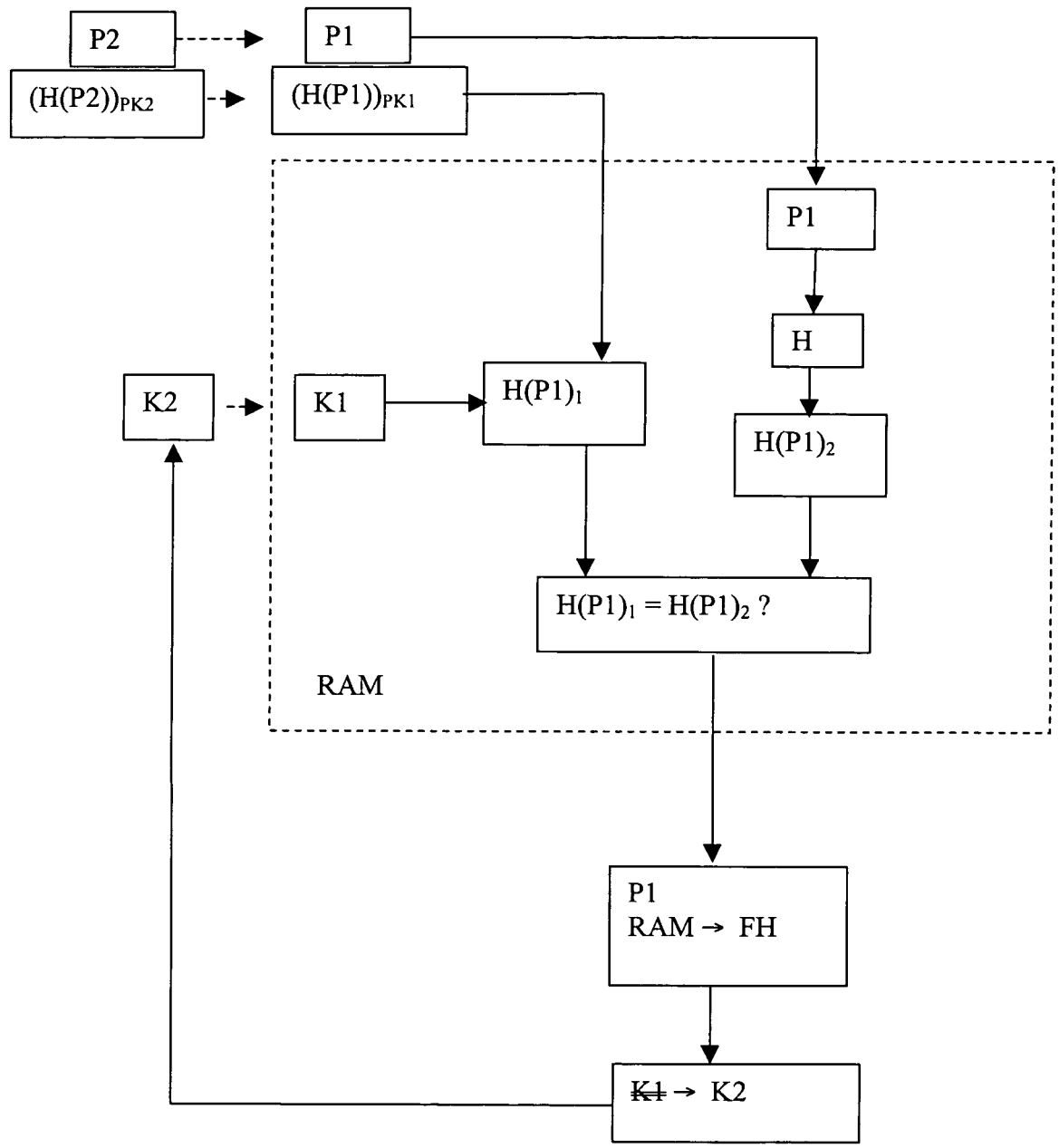
FIG. 1 represents the progress of an updating process of a decoder from a version N to a version N+1.

In the example disclosed in FIG. 1, an initial version decoder is updated to the version 1 with a patch P1. This patch P1 is transmitted with its signature (H(P1))PK1 by the operator's managing center towards the decoder. The updating process begins by the loading of the patch P1 into the RAM of the decoder.

The signature (H(P1))PK1 is obtained by the encryption of the digest H(P1) of the patch P1 with the private key PK1 of the operator, this operation being carried out in the managing center. This digest is calculated by the operator from the patch P1 with a unidirectional hash type function H.

The decoder software decrypts the received signature (H(P1))PK1 with a public key K1 in order to obtain the digest of the patch H(P1)1. Simultaneously, this same software calculates the digest H(P1)2 of the patch P1 stored in the RAM. The first digest issued from the decryption of the signature H(P1)1 and the second H(P1)2 resulting from the calculation by means of the hash function H are compared. If the two values correspond, the patch P1 is installed in the decoder's non-volatile Flash memory FH in order to carry out the updating of the decoder software. The public key K1 used to decrypt the signature is deleted from the list.

A second update of version 1 to version 2 transmitted by the managing center in the form of a new patch P2 accompanied by its signature (H(P2))PK2 passes through the same downloading and verification process. A new public key K2 taken from the list will then be used by the decoder. All the following transmitted updates are verified in the same way using each time a new public key taken from the list. The previous updating keys are neutralized either by deletion or by a suitable marking.

By applying this process, a software update from version 1 to version N is carried out in N−1 steps. The managing center will transmit N−1 patches with corresponding N−1 signatures each encrypted by a private key specific for each version. The installation of the different patches thus leads to the neutralization of N−1 public keys from the list.

The list of public keys can be stored, for example, in a non-volatile memory of the type EEPROM (Electrically Erasable Programmable Read-Only Memory). After each use of a key during an update, said key is definitively deleted from the EEPROM authorizing the access to the following key for the next update.

According to another embodiment, the list of public keys is not altered by the deletion or marking of a key. After each installation of a software version in the non-volatile Flash memory, a counter is incremented or a pointer moves to indicate the position of the key to be selected from the list during the next update. Therefore, at each update, only the key which will serve to decrypt the signature of the patch is designated, the previous keys no longer being available for selection because the counter or the pointer can only progress in one direction, that of increasing positions.

According to a variant, the patch can be encrypted by the private key of the operator. A supplementary decryption step is thus added to the above-described process. The patch P received and loaded into the RAM can be decrypted with the public key before the calculation with the hash function H of the digest serving as signature verification. The calculation of the digest can also be carried out on the patches in its encrypted form.

Update installation by a third party is made more difficult by the fact that each version change requires knowledge of the current key. The latter changes at each update, which obliges the third party to know all the keys in order to follow the different updates.

The previously described process can occur a problem when the decoder has remained out of service during a time in which several updates should have been carried out. The passing of an old software version to a new version whose number is not consecutive to that of the previous version is carried out sequentially in several successive steps. The said steps use different public keys taken from the list one after the other and in a consecutive order. It is reminded that the patch itself does not contain a command that allows the selection of a key other than the current key. If it is the case, a third party could use this command to force the use of a key known to said third party.

Figure 2:
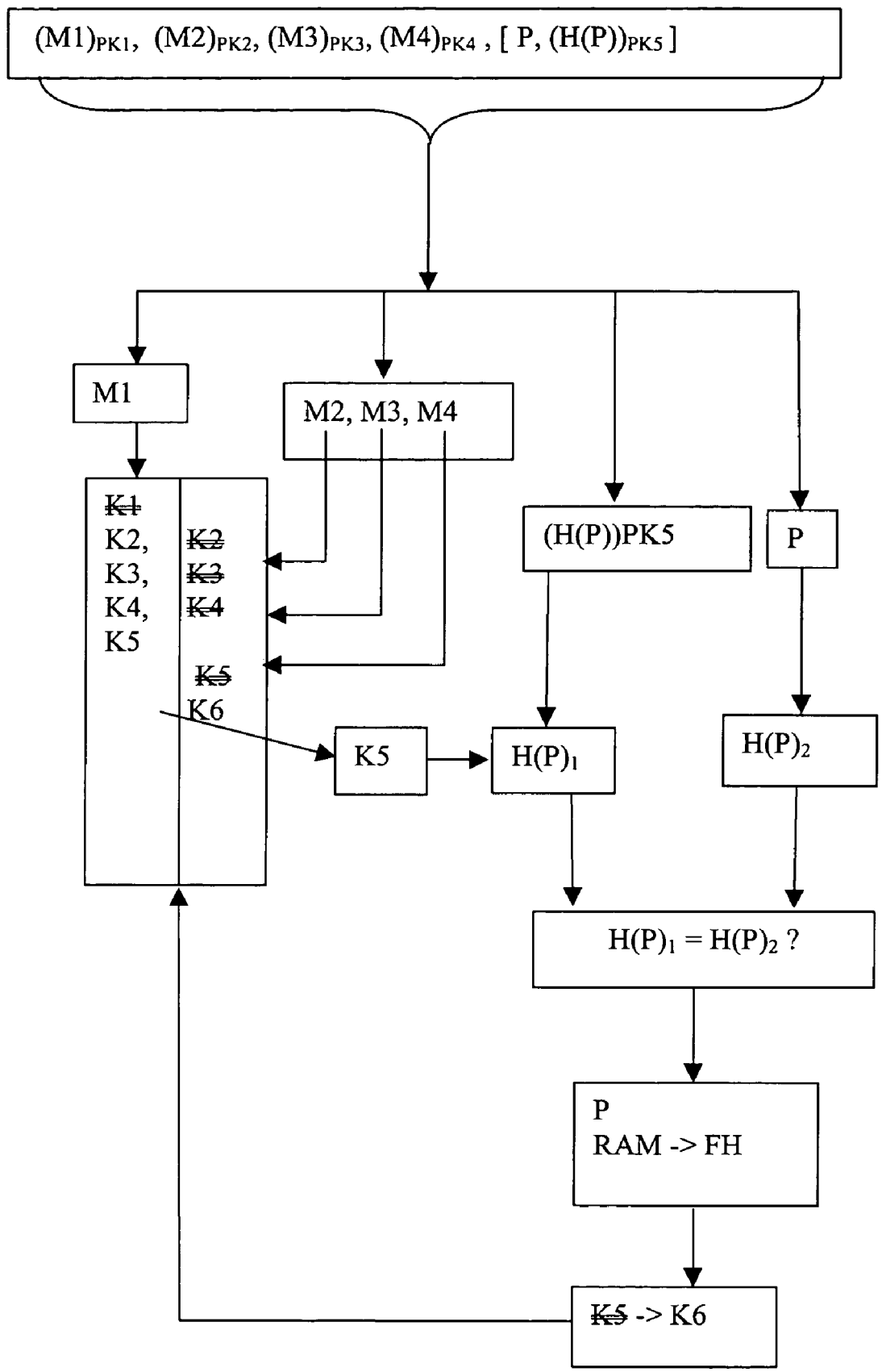
FIG. 2 shows an updating from a version N to a version R

FIG. 2 shows the case of the passing from a software version N to a version R where the difference R−N between the new version and the previous version is greater than one. The following example refers to a case where N=2 and R=5.

A decoder with version 2 software cannot directly decrypt the signature (H(P))PK5 of the new version 5 because the key available in the list of public keys is that of the version immediately higher, namely the key K3. For the installation of the new version 5, the decoder must be able to gain access to the key corresponding to this version, that is to say the key K5.

The solution consists in transmitting a data flow containing the patch P for updating the software of the decoder to version 5 signed with the key PK5 to which a plurality of messages M1, M2, M3, M4 are added, each encrypted with a private key PK1, PK2, PK3, PK4 taken from the key list. The RAM memory stores these messages as well as the patch P with its signature (H(P))PK5. The version of the decoder being 2, the updating key of version 1 to 2 is already deactivated by the first update. The message M1 is then ignored because the key K1, that serves to decrypt it, is no longer available.

The following messages M2, M3 and M4 are used to consecutively deactivate the public keys K2, K3, and K4 that correspond to each intermediate version from version 2 to version 4 preceding version 5. Therefore, to install version 5 in the non-volatile Flash memory, each public key K2, K3, and K4 of the list is used then neutralized or deleted. During the decryption of the message by the correct key, the content of this message is recognized and induces the neutralization operation of the current key. If the message is not recognized, this means that the encryption key of this message is not the current key.

After the successive and correct decryption of the messages M2, M3, M4, the key K5 necessary for the decryption of the signature of the patch (H(P))PK5 (and of patch P) becomes the current key. The latter will also be deleted from the list after the installation of the patch and the key K6 will be present at the head of list for the subsequent update of version 5 to version 6.

This type of flow can thus update an entire group of decoders regardless of their software version thanks to the key change messages that accompany the patch. Each decoder disposes of a public key in the list able to decrypt an update of the current version after the neutralization of the old keys.

During a decoder software update of version N to a version R where the difference R−N becomes large, for example over 10, it becomes tedious for a decoder with version R−1 to systematically decrypt all the messages in order to verify the deactivation orders. This decoder will apply its current key (R−1) to all of these messages to notice that it is unable to interpret its contents.

A first solution consists in introducing in the message header indexes in clear that correspond to the numbers of the different versions. This index only serves to avoid the decryption of messages that have been encrypted by a key other than the current key. This index does not select the position of the current key, only the successful decryption of a message with said current key induces the advance of one position in the keys list.

According to a second solution, the digest of the updating patch is successively encrypted by all the private keys of the previous updates. This process obliges the use of each public key on the list, consecutively, to decrypt the signature. In this case of encryption in chain, unlike in the previous case, all the public keys must remain available in the EEPROM of the decoder. For example, for an update of version 1 to version N, the digest of the patch P is encrypted with a private key of version N. The whole set is then encrypted with the private key of version N−1, then with the key of version N−2 and so on until the version 1. The decryption thus requires the successive use of public keys K1 to KN−1 corresponding to the updates of version 1 to version N. The interruption of this iterative mechanism is enabled by means of the recognition of a suitable mark in the decryption result.

If one wishes to protect the update data, one method consists in the use of a session key SK randomly generated by the managing center for example. For reasons of operation speed, this key is of a symmetrical type. The managing center encrypts the patch with the session key SK and composes a data set that includes the session key SK and the digest of the updating patch. This set is encrypted by the current private key of the operator to make up the control block.

The encrypted patch and the control block are loaded into the RAM memory of the decoder. The block is decrypted by the current public key on the list, which provides the patch digest and the session key SK. The latter is applied to the patch loaded in the RAM thus allowing its decryption. Then, the patch digest is verified and in the case of correspondence the patch is installed in the non-volatile Flash memory.

The session key can be introduced as a supplementary securing mean in any of the variants described above, for example:
  the simple update of version 1 to version N in several steps,
  the updating of version N to R with a patch and key deactivation messages.

In a decoder that has been updated several times, the number of available public keys decreases while the number of deactivated keys increases with the successful updates. In order to rebuild a list of keys to allow future updates, a new public key list can be sent to the decoder by the managing center. This list can be incorporated into the data, flow and accompanied by a signature as in the case of an updating patch. Said list is stored in the EEPROM and replaces the old list containing the deactivated keys.

According to a variant of the method of the invention, the managing center and the decoders dispose respectively of a fixed private and public key list. For each update, the managing center randomly selects a private key set from those on the list and encrypts the patch digest successively with each key of the set. The center creates a data block that includes the encrypted digest (signature) and a series of numbers corresponding to the positions of the previously chosen keys. Said series can be transmitted in clear or encrypted with a session key. The decoder receiving said series selects from the list of public keys, according to their position, the keys necessary to decrypt the patch digest. The list cannot include the same key number more than once and the length of this list (number of keys used) is known and non-modifiable. In this variant, the lists of keys remain fixed and are not altered after a successful patch installation. At each update, a new key combination taken from the list is used for the patch signature. Therefore, a third party must always dispose of a set of keys in order to introduce an update into an apparatus, which requires more important means than the means required to determine a single key.

The update securing process according to the invention is independent of the transmission mode used between a supplier and a user. In fact, the process can also be applied to patches distributed on CD-ROM, on disks or on any other digital data storage medium.

What is claimed is:

1. A method for securing updating data from a plurality of apparatuses, each apparatus receiving the updates from a managing center, the updates including patch data accompanied by a control message encrypted by a private asymmetrical key taken from a list of keys included in the managing center, the method comprising the steps of:
    (a) selecting by the apparatus of a current public key from a list of public keys stored in a non-volatile memory of the apparatus;
    (b) receiving and storing the patch data in a random access memory;
    (c) receiving the encrypted control message;
    (d) decrypting the encrypted control message using the selected current public key;
    (e) verifying that the decrypted control message corresponds to said patch data;
    (f) installing the patch data;
    (g) deactivating the current public key such that a different public key is used to decrypt a next control message; and
    (h) repeating steps a-g for a subsequent patch data and encrypted control message using a subsequent public key selected by the apparatus from the list of public keys stored in the non-volatile memory, the subsequent public key being different from the current public key deactivated in step (g).

2. The method according to claim 1, wherein the control message includes a signature on the patch data, the signature being a result of a hash function.

3. The method according to claims 1 or 2, wherein the verifying step includes the step of establishing the signature on the received patch and the comparison with the decrypted signature in the control message.

4. The method according to claim 1, wherein the control message includes a symmetrical session key determined by the managing center, the symmetrical session key being used to encrypt the patch data.

5. The method according to claim 1, wherein, for each encrypted control message, a new public key taken from the list is used by the apparatus.

6. The method according to claim 1, wherein the public key is deleted from the list after being used, said key being useless for the next updates.

7. The method according to claim 1, wherein the public keys of the list are used sequentially in a predetermined order during each update.

8. The method according to claim 1, wherein the list of public keys is stored in a non-volatile memory, and wherein a key used for an update is definitively deleted from the memory that authorizes the access to the next key for the subsequent update.

9. The method according to claim 1, wherein, for the updating of the software of an apparatus of an old version to a new version, with a difference between the new version and the old version being greater than one, at least one message encrypted with a private key is added allowing the changing of the current key to the next key in the list, the successful decryption of said message inducing the deactivation of the current key and the selection of the next key.

10. The method according to claim 9, wherein the number of messages corresponds to the number of updates separating the initial version of the apparatus and the final version of the update.

11. The method according to claim 1, wherein an updating installation is followed by an increment on a counter or by moving a pointer indicating the position of the key to be selected from the list during the subsequent update, while the list of keys remains unchanged.

12. The method according to claim 1, wherein the control message is successively encrypted by the keys of the previous updates, each key from the list being used one after the other to decrypt the signature.

13. The method according to claim 1, wherein the apparatuses consist of Pay-TV decoders, an update of a decoder being carried out by downloading, from a managing center, of a patch accompanied by a control message, said block is stored in a Random Access Memory, and is decrypted with a current public key contained in a first non-volatile memory of the decoder, then verified and in the case of correspondence, a command leads the installation of the patch in a second non-volatile memory and the deactivation of the current key.

14. The method according to claim 13, wherein a new list of public keys is transmitted to the decoder, said list replaces the list contained in the first memory containing keys deactivated by previous successful updates.

15. A system for securing software updates including patch data, the system comprising:
    a processor; and
    a non-volatile memory connected to the processor for storing a list of public keys;
    wherein the processor is configured to perform the steps of
        (a) receiving the patch data;
        (b) receiving an encrypted control message associated with the patch data, the encrypted control message being encrypted with an asymmetrical private key selected from a list of keys in a management center;
        (c) selecting a public key from the list of public keys stored in the non-volatile memory;
        (d) decrypting the encrypted control message using the key selected in the previous step;
        (e) verifying that the control message corresponds to the patch data;
        (f) installing the patch data if the encrypted control message corresponds to the patch data; and
        (g) deactivating the public key used in the decrypting step such that a different public key from the list of public keys stored in the non-volatile memory is used to decrypt a subsequent control message; and
        (h) repeating steps a-g for a subsequent patch data and encrypted control message using a subsequent public key selected by the apparatus from the list of public keys stored in the non-volatile memory, the subsequent public key being different from the current public key deactivated in step (g).

16. The system of claim 15, wherein the memory is an electrically erasable programmable read only memory (EEPROM).

17. The system of claim 15, wherein the control message includes a signature on the patch data, the signature being a result of a hash function.

18. The system of claim 15, wherein the control message includes a symmetrical session key determined by the managing center, the symmetrical session key being used to encrypt the patch data.

* * * * *